US 6,641,795 B2

(12) United States Patent
Abe

(10) Patent No.: US 6,641,795 B2
(45) Date of Patent: Nov. 4, 2003

(54) REFORMER AND METHOD FOR OPERATION THEREOF

(75) Inventor: Fumio Abe, Handa (JP)

(73) Assignee: NGK Insulators, Ltd. (JP)

(*) Notice: Subject to any disclaimer, the term of this patent is extended or adjusted under 35 U.S.C. 154(b) by 15 days.

(21) Appl. No.: 09/983,748

(22) Filed: Oct. 25, 2001

(65) Prior Publication Data

US 2002/0081253 A1 Jun. 27, 2002

Related U.S. Application Data

(62) Division of application No. 09/176,765, filed on Oct. 22, 1998, now abandoned.

(30) Foreign Application Priority Data

Oct. 28, 1997 (JP) .............................. 9-296004

(51) Int. Cl.⁷ .............................. C01B 3/02; C01B 3/22; C01B 3/26
(52) U.S. Cl. .............................. 423/648.1; 423/437.2; 423/651; 423/652; 423/655; 423/656
(58) Field of Search .............................. 423/437.2, 655, 423/656, 648.1, 650, 651, 652, 653, 654

(56) References Cited

U.S. PATENT DOCUMENTS

| | | | | |
|---|---|---|---|---|
| 4,391,794 A | * | 7/1983 | Silberring | 423/650 |
| 4,451,578 A | * | 5/1984 | Setzer et al. | 423/651 |
| 4,522,802 A | * | 6/1985 | Setzer et al. | 423/652 |
| 4,711,930 A | | 12/1987 | Hoelderich et al. | 502/209 |
| 5,149,508 A | | 9/1992 | Bullock | 422/174 |
| 5,281,462 A | | 1/1994 | Day et al. | 502/527.19 |
| 5,370,943 A | | 12/1994 | Bruck et al. | 502/527.19 |
| 5,417,062 A | | 5/1995 | Swars et al. | 60/300 |
| 5,426,084 A | | 6/1995 | Fukaya et al. | 502/527.19 |
| 5,833,723 A | * | 11/1998 | Kuwabara et al. | 423/648.1 |
| 5,856,263 A | | 1/1999 | Bhasin et al. | 423/213.5 |
| 5,866,498 A | | 2/1999 | Chattha et al. | 423/213.5 |
| 5,883,138 A | * | 3/1999 | Hershkowitz et al. | 252/373 |
| 5,942,346 A | * | 8/1999 | Ahmed et al. | 423/651 |

FOREIGN PATENT DOCUMENTS

| | | |
|---|---|---|
| GB | 2 268 694 A | 1/1994 |
| JP | 6-48701 | 2/1994 |
| JP | 7-315802 | 12/1995 |
| WO | WO 97/11904 | 4/1997 |

OTHER PUBLICATIONS

Patent Abstracts of Japan; vol. 008, No. 067 (C–216); Mar. 29, 1984 & JP 58 219945 A (Matsushita Denki Sangyo KK); Dec. 21, 1983 *abstract*.
Patent Abstracts of Japan; vol. 017, No. 533 (C–1114); Sep. 27, 1993 & JP 05 147903 A (Fuji Electric Co Ltd); Jun. 15, 1993 *abstract*.
Patent Abstracts of Japan; vol. 016, No. 040 (C–0906); Jan. 31, 1992 & JP 03 247501 A (Mitsubishi Heavy Ind Ltd); Nov. 5, 1991 *abstract*.
Patent Abstracts of Japan; vol. 016, No. 283 (C–0955); Jun. 24, 1992 & JP 04 074701 A (Fuji Electric Co Ltd); Mar. 10, 1992 *abstract*.

* cited by examiner

Primary Examiner—Wayne A. Langel
(74) Attorney, Agent, or Firm—Parkhurst & Wendel, L.L.P.

(57) ABSTRACT

A reformer disposed in the flow path of a reactant fluid includes: a catalyst unit capable of generating hydrogen from a reactant fluid containing an organic compound or carbon monoxide, by catalysis, and an electrically heatable heater unit. An electrically heatable catalyst unit includes: any of a sintered material, a metallic material, a composite material thereof, at least a portion of each of these materials having an electrically heatable property, and a composite material of (1) a heat-resistant material having no electrically heatable property and (2) the sintered material and/or the metallic material, and a catalyst capable of generating hydrogen from a reactant fluid containing an organic compound or carbon monoxide, by catalysis, which catalyst unit has porosity, thereby enables diffusion of a reactant fluid therethrough, and is electrically heatable. The above reformer can generate high-purity hydrogen for use in fuel cell of industrial or automotive application, in a short time.

6 Claims, 6 Drawing Sheets

REFORMER AND METHOD FOR OPERATION THEREOF

This is a Division application Ser. No. 09/176,765 filed Oct. 22, 1998, abandoned.

BACKGROUND OF THE INVENTION (1) Field of the Invention

The present invention relates to a reformer for hydrogen generation, suitably used in industries and vehicles; a catalytic reactor; an electrically heatable catalyst used in said reformer or catalytic reactor; and a method for operation of said reformer.

(2) Description of the Related Art

In recent years, production of electricity without causing environmental pollution has drawn attention and an interest in fuel cell has increased. Fuel cell has various advantages such as high efficiency in power generation, formation of small amount of carbon dioxide ($CO_2$) and substantially no formation of harmful substances such as carbon monoxide (CO), nitrogen oxides (NOx) and the like. Therefore, researches and developments on use of fuel cell in on-site type power generator or automobile have been under way recently. In generating electricity using a fuel cell, high-purity hydrogen is required. This hydrogen is produced by using, as a starting material, a hydrocarbon (e.g. butane or propane), an alcohol (e.g. methanol), CO or the like and conducting a catalytic reaction.

The main reaction in the above hydrogen production is steam reforming which takes place in the presence of steam and a catalyst. Since the steam reforming is generally an endothermic reaction although it differs depending upon the starting material used, it is important to heat the catalyst to a desired temperature uniformly. Decrease in reaction temperature invites formation of coke and resultant deactivation of catalyst; therefore, great care is necessary in industrial designing of the reactor.

Further, since the above steam reforming has a low reaction speed unlike combustion reaction, a relatively large catalyst volume is required in treating a given amount of a starting material. Meanwhile, the catalyst functions at high temperatures. Hence, a long time is taken to warm up the catalyst. Thus, there have been problems when the steam reforming is utilized in an on-site generator or an automobile where quick hydrogen generation is required.

In conventional catalytic processes for hydrogen production by steam reforming, the catalyst used has generally been heated externally. When a starting material is passed over a fixed catalyst bed and a relatively large reaction tube is used, it is difficult to transfer a heat to the center of the catalyst bed and there has been used a complicated mechanism that a tubular reactor is heated by the use of a heating medium such as metal bath, combustion waste gas or the like.

In other conventional catalytic process for hydrogen production by steam reforming, the heating of the catalyst used has been conducted by introducing a combustion waste gas (generated in gas-phase reaction or catalytic combustion) into the reaction tube and heating the catalyst with the heat of the waste gas. This process is not preferred because it increases the flow amount of fluid, reducing the activity of intended reaction and generating more $CO_2$ by combustion.

In the gas produced by the steam reforming, hydrogen has no sufficient purity to be used in a fuel cell and CO has a deactivating effect on the Pt-based electrode used in the fuel cell. Therefore, a CO shift reaction (an aqueous conversion reaction) and a CO selective oxidation reaction are conducted to increase the purity of hydrogen. However, there are many technical problems as to the way in which the catalysts used therein are heated so as to function or the way in which the reactions are allowed to proceed stably.

As other process for generating hydrogen from a hydrocarbon or the like, there is a process which comprises generating hydrogen and CO by a partial oxidation reaction of a hydrocarbon in place of the above-mentioned steam reforming and then conducting the above-mentioned CO shift reaction and CO selective oxidation reaction to obtain hydrogen. In this process, the partial oxidation reaction of the first step is an exothermic reaction and is substantially free from the problem of heat supply; however, since the reaction temperature is generally higher than that of the steam reforming, technical problems remain unsolved as to how the catalyst temperature is maintained and how high-purity hydrogen is generated in a short time when the process is utilized in an on-site generator or an automobile. Also as other process for generating hydrogen from a hydrocarbon or the like, there is a process using a decomposition reaction. A specific example of the decomposition reaction is a decomposition reaction for generating hydrogen from methanol. This reaction is an endothermic reaction similarly to the steam reforming, and there are the same problems as mentioned above.

Also in industries where hydrogen is consumed in a large amount, such as ammonia synthesis, hydrogenation, hydrodesulfurization and the like, there are many technical problems to be solved in areas such as reaction efficiency, operational energy, period of reactor start-up and conversion of starting material.

SUMMARY OF THE INVENTION

In view of the above-mentioned problems of the prior art, the present invention aims at providing a reformer capable of generating high-purity hydrogen for fuel cell used in industries or automobile, in a short time; a catalytic reactor; an electrically heatable catalyst unit used therein; and a method for operation of the reformer.

According to the present invention, there is provided, as a first invention, a reformer disposed in the flow path of a reactant fluid, which comprises:
  a catalyst unit capable of generating hydrogen from a reactant fluid containing an organic compound or carbon monoxide, by catalysis, and
  an electrically heatable heater unit.

According to the present invention, there is also provided, as a second invention, a reformer disposed in the flow path of a reactant fluid, which comprises a catalyst unit capable of generating hydrogen from a reactant fluid containing an organic compound or carbon monoxide, by catalysis, wherein at least part of the catalyst unit is constituted so as to be electrically heatable.

According to the present invention, there is also provided, as a third invention, an electrically heatable catalyst unit comprising:
  any of a sintered material, a metallic material, a composite material thereof, at least a portion of each of these materials having an electrically heatable property, and a composite material of (1) a heat-resistant material having no electrically heatable property and (2) said sintered material and/or said metallic material, and a catalyst capable of generating hydrogen from a reactant fluid containing an organic compound or carbon monoxide, by catalysis, which catalyst unit has porosity, thereby enables diffusion of a reactant fluid therethrough, and is electrically heatable.

According to the present invention, there are also provided, as a fourth invention and a fifth invention, a method for operation of a reformer disposed in the flow path of a reactant fluid and comprising a catalyst unit capable of generating hydrogen from a reactant fluid containing an organic compound or carbon monoxide, by catalysis, and an electrically heatable heater unit, which method comprises electrically heating the heater unit at the start-up of the reformer and thereby generating hydrogen, and a method for operation of a reformer disposed in the flow path of a reactant fluid and comprising a catalyst unit capable of generating hydrogen from a reactant fluid containing an organic compound or carbon monoxide, by catalysis, at least part of the catalyst unit being constituted so as to be electrically heatable, which method comprises electrically heating the catalyst unit at the start-up of the reformer and thereby generating hydrogen.

According to the present invention, there are also provided, as a sixth invention and a seventh invention, a method for operation of a reformer disposed in the flow path of a reactant fluid and comprising a catalyst unit capable of generating hydrogen from a reactant fluid containing an organic compound or carbon monoxide, by catalysis, and an electrically heatable heater unit, which method comprises electrically heating the heater unit so that the temperature of the catalyst unit during reaction is stabilized and thereby generating hydrogen, and a method for operation of a reformer disposed in the flow path of a reactant fluid and comprising a catalyst unit capable of generating hydrogen from a reactant fluid containing an organic compound or carbon monoxide, by catalysis, at least part of the catalyst unit being constituted so as to be electrically heatable, which method comprises electrically heating the catalyst unit so that the temperature of the catalyst unit during reaction is stabilized and thereby generating hydrogen.

According to the present invention, there are also provided, as an eighth invention and a ninth invention, a catalytic reactor disposed in the flow path of a reactant fluid, which comprises:
an electrically heatable heater unit, and
a catalyst unit capable of catalyzing an endothermic reaction, and a catalytic reactor disposed in the flow path of a reactant fluid, which comprises a catalyst unit capable of catalyzing an endothermic reaction, at least part of the catalyst unit being constituted so as to be electrically heatable.

According to the present invention, there is also provided, as a tenth invention, an electrically heatable catalyst unit comprising:
any of a sintered material, a metallic material, a composite material thereof, at least a portion of each of these materials having an electrically heatable property, and a composite material of (1) a heat-resistant material having no electrically heatable property and (2) said sintered material and/or said metallic material, and a catalyst capable of catalyzing an endothermic reaction, which catalyst unit has porosity, thereby enables diffusion of a reactant fluid therethrough, and is electrically heatable.

According to the present invention, there are also provided, as an eleventh invention and a twelfth invention, a method for operation of a catalytic reactor disposed in the flow path of a reactant fluid and comprising an electrically heatable heater unit and a catalyst unit capable of catalyzing an endothermic reaction, which method comprises electrically heating the heater unit, and a method for operation of a catalytic reactor disposed in the flow path of a reactant fluid and comprising a catalyst unit capable of catalyzing an endothermic reaction, at least part of the catalyst unit being constituted so as to be electrically heatable, which method comprises electrically heating the catalyst unit.

DETAILED DESCRIPTION OF THE PREFERRED EMBODIMENTS

Figure 1:
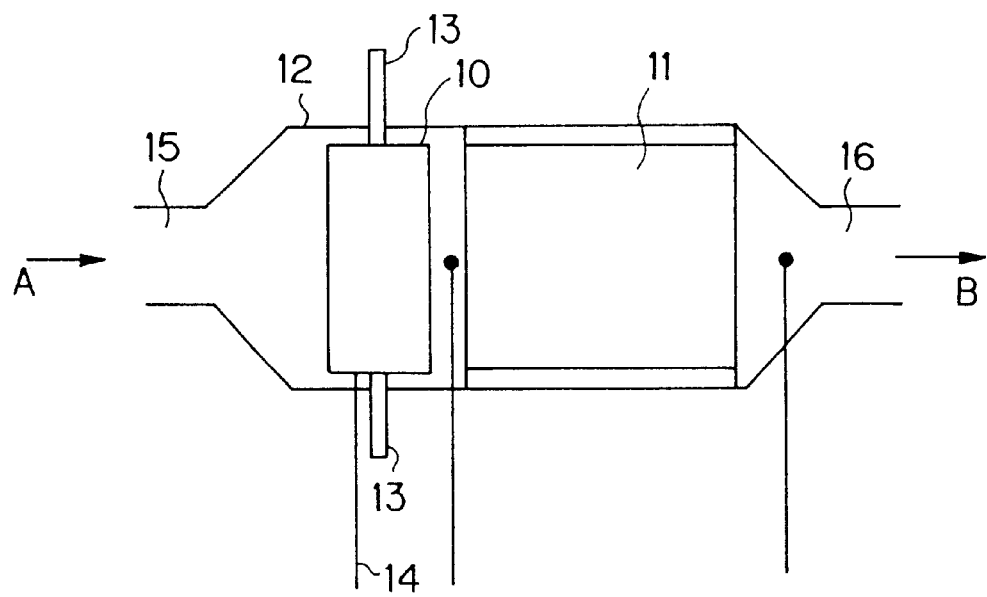
FIG. 1 is a schematic sectional view showing one embodiment of the reformer of the first invention.

According to the present invention, there is provided a reformer which can generate hydrogen at a high purity in an appropriate amount in a short time and which can be used as a hydrogen generator for on-site power generator or automobile.

The embodiments of present invention are hereinafter described in detail. However, the present invention is not restricted to these embodiments.

In the present invention, there is used, as the starting material for obtaining hydrogen, a reactant fluid containing an organic compound such as hydrocarbon (e.g. butane or propane) or alcohol (e.g. methanol), or carbon monoxide (CO). A hydrocarbon is preferred in view of the transportation via a bomb or a pipe. In view of the handleability when mounted on an automobile, a gasoline or an alcohol (e.g. methanol), which is a liquid and easy to mount, is preferred. However, the staring material for obtaining hydrogen is not restricted to these. CO is not preferred as the starting material because it is a toxic gas.

The main reaction in the reformer of the present invention is a steam reforming reaction taking place in the presence of steam. Further, a CO shift reaction and a CO selective oxidation reaction are allowed to take place to reduce CO (a by-product), in order to obtain high-purity hydrogen and alleviate the deactivation of the electrode of fuel cell by CO. An example of the reactions taking place when butane is used as a starting material, is shown below.

| (1) $C_4H_{10} + 4H_2O \rightarrow 9H_2 + 4CO$ | Steam reforming reaction |
| (2) $CO + H_2O \rightarrow CO_2 + H_2$ | CO shift reaction |
| (3) $CO + 1/2O_2 \rightarrow CO_2$ | CO selective oxidation reaction |

Hydrogen can also be obtained by using a partial oxidation reaction in place of the steam reforming reaction.

$$C_4H_{10} + 2O_2 \rightarrow 4CO + 5H_2 \quad \text{Partial oxidation reaction} \quad (4)$$

Following the above partial oxidation reaction, the above reactions (2) and (3) are allowed to proceed to increase the purity of hydrogen. The process for obtaining hydrogen based on the reaction (1) is called "steam reforming process", and the process for obtaining hydrogen based on the reaction (4) is called "partial oxidation process". The present invention is applicable to any of these processes. Use of the steam reforming process or the partial oxidation process in hydrogen production is optional. For use in fuel cell mounted on automobile, the partial oxidation process is drawing attention when gasoline is used as the starting material, and the steam reforming process is drawing attention when an alcohol (e.g. methanol) is used as the starting material. In general, the steam reforming process can produce high-purity hydrogen easily at low temperatures and is efficient.

As the reaction for generating hydrogen from methanol, there are the following two reactions.

| (5) $CH_3OH \rightarrow CO + 2H_2$ | Decomposition reaction (endothermic) |
| (6) $CH_3OH + H_2O \rightarrow 3H_2 + CO_2$ | Steam reforming reaction (endothermic) |

In these reactions, different catalysts are used generally (the catalysts used are described later) and the reaction temperatures are different. The reactions (1), (5) and (6) are endothermic generally and require temperatures of 500° C. or higher. The reactions (2) and (3) are exothermic and are allowed to proceed at relatively low temperatures of 300° C. or lower. The reaction (4) is exothermic and requires a temperature of 500° C. or higher. To obtain high-purity hydrogen, the reactions (1) [or (5) and (6)], (2) and (3) or the reactions (4), (2) and (3) are conducted with respective catalysts being disposed in series in the flow path of a reactant fluid. Depending upon the hydrogen purity required, it is possible to conduct only the reaction (1) [or (5) and (6)] or the reaction (4) in the reformer; when CO is used as a starting material, the reaction (2) and, as necessary, the reaction (3) are conducted.

Detailed description is made below on the reformer, catalytic reactor, electrically heatable catalyst used therein, and method for operation of said reformer, all according to the present invention.

The first invention relates to:
a reformer disposed in the flow path of a reactant fluid, which comprises:
a catalyst unit capable of generating hydrogen from a reactant fluid containing an organic compound or carbon monoxide, by catalysis, and
an electrically heatable heater unit.

An embodiment of the reformer is shown in FIG. 1.

In FIG. 1, a heater unit 10 and a catalyst unit 11 are disposed in a metallic casing 12 which forms a flow path of reactant fluid, whereby a reformer is constituted. The heater unit 10 has electrodes 13, and electricity is supplied thereto from an external electric source not shown in FIG. 1. Ordinarily, the heater unit 10 is disposed upstream of the catalyst unit 11 in the flow direction of reactant fluid. In the heater unit 10 or downstream thereof is disposed a sensor 14 (including a thermocouple or the like) for controlling the heater unit 10. A reactant fluid A is fed into the reformer from an inlet 15, passes through the heater unit 10 and the catalyst unit 11, and reaches an outlet 16. A fluid B containing the hydrogen produced leaves the outlet 16 and is transferred to a fuel cell section disposed downstream of the reformer.

The heater unit 10 disposed in the flow path of reactant fluid may be a bar or plate made of nichrome or the like. However, in order to efficiently heat the catalyst unit 11 disposed downstream of the heater unit 10, the heater unit 10 is suitably a porous material, for example, a spongy structure, a cloth-like material, a filter-like material or a honeycomb structure (including a platy catalyst), all having a porosity of 50% or more. In particular, a honeycomb structure having linear passages in the flow direction of reactant fluid A is most preferred because of the high heat transfer to reactant fluid and the low pressure loss.

The catalyst unit 11 contains at least one of the catalyst components having catalysis for the above-mentioned steam reforming reaction, partial oxidation reaction or decomposition reaction, CO shift reaction, CO selective oxidation reaction, etc. The CO selective oxidation reaction is for reduction in CO and has no direct relation to hydrogen production; however, when high-purity hydrogen is required, the reaction is important and allowed to proceed in the reformer and the catalyst for the reaction is contained in the catalyst unit 11.

The heater unit 10 may be an electrically heatable material per se; however, in view of the warm-up property and reaction acceleration of the catalyst 11 during cold start-up and the temperature stabilization of the catalyst 11 during steady-state operation, the heater unit 10 preferably contains at least one of the catalyst components having catalysis for the above-mentioned steam reforming reaction, partial oxidation reaction or decomposition reaction, CO shift reaction, CO selective oxidation reaction, etc. The catalyst presence in the heater unit 10 may be achieved by mixing of the catalyst(s) and the electrically heatable material, but is preferably achieved by loading the catalyst(s) on the electrically heatable material. In view of the reaction activity expected, most preferred is a heater unit obtained by loading the catalyst(s) on, for example, the above-mentioned sponge-like porous material having an electrical heatability, particularly the above-mentioned honeycomb structure having an electrical heatability.

As the material for the heater unit 10, there can be used a sintered material having an electrical heatability, for example, barium titanate (so-called PTC, a substance having a positive temperature coefficient), a carbide (e.g. SiC or $MoSi_2$), a superconductive oxide of Y or Bi type, a perovskite showing a negative temperature coefficient, an oxygen ion-conductive material (e.g. $ZrO_2$), a silicide, a boride, a nitride, or an ion-conductive glass although this is not a sintered material.

As the material for the heater unit 10, there can also be used a metal having an electrical heatability such as Fe—Cr—Al ferrite or other alloy (e.g. Ni—Cr, Fe—Al, Fe—Cr or Ni—Al); or a cermet which is a composite material of the above metal and a heat-resistant material having no electrical heatability (e.g. alumina).

Figure 2:
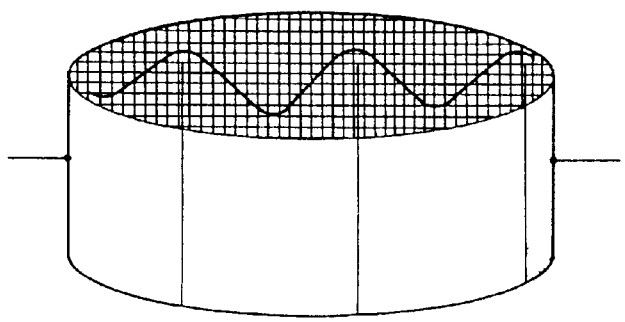
FIG. 2 is a perspective view showing a honeycomb structure.
Figure 3:
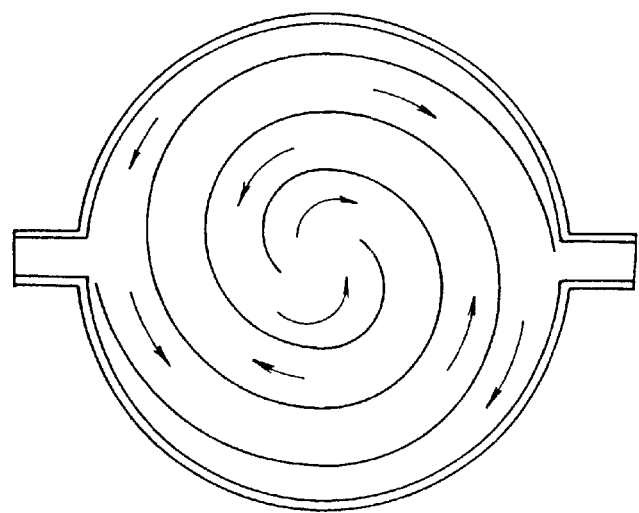
FIG. 3 is a schematic sectional view showing other honeycomb structure.

The above-mentioned materials for the heater unit 10 can be used singly or in the form of a composite material of two or more kinds, or may be used as a composite material with a catalyst component(s). Importantly, any material for the heater unit 10 must have an electrical heatability, and there is no other restriction as to the kind of the material. An alloy such as Fe—Cr—Al, Fe—Al, Fe—Cr or the like is preferred in view of the cost and easy production. These alloys are already in commercial use in catalytic convertors for automobile and have various advantages in that they have excellent heat resistance and thermal shock and can be easily made into a honeycomb structure by rolling or powder metallurgy. Examples of the honeycomb structure are shown in, for example, Japanese Patent Application Kokai (Laid-Open) No. 295184/1991 (FIG. 2) and National Publication of International Patent Application No. 500911/1991 (FIG. 3).

To the heater unit 10 are connected electrodes 13 for electrifying the heater unit 10, and electricity is supplied thereto from an external electric source. When the present reformer is mounted on an automobile, the electric source can be a battery, an alternator, a capacitor (a condensor) or the like. In the heater unit 10, the resistance must be adjusted depending upon the power supplied, the voltage used, etc. There is no restriction as to the adjustment of the resistance; however, when the heater unit 10 is a honeycomb structure, the adjustment can be made by forming slits or gaps therein as shown in Japanese Patent Application Kokai (Laid-Open) No. 295184/1991 and National Publication of International Patent Application No. 500911/1991.

The catalyst unit 11 is used in the form of beads, pellets, grains, a honeycomb or a plate. Beads or the like is preferably used in view of the fluid miscibility and the thermal conductivity. However, since (1) the catalyst unit 11 is used in combination with the heater unit 10, (2) thereby the reactant fluid in the flow path of fluid is favorably heated, and (3) the heat of the heated fluid can be transferred to the catalyst unit 11 mainly by convection, a honeycomb structure having a honeycomb shape or a plate shape is preferably used in view of the low pressure loss and the high mechanical strength. A honeycomb structure refers to a structure having passages (cells) surrounded by substantially uniform partition walls, and includes a platy catalyst.

When the catalyst unit 11 is used in the form of a honeycomb structure, the honeycomb structure may be made of a catalyst component(s) per se, or may be obtained by loading a catalyst component(s) on a honeycomb carrier made of an inert material such as cordierite, mullite or the like.

The catalyst unit 11 is constituted by arranging, generally in series, a catalyst for steam reforming reaction, partial oxidation reaction or decomposition reaction, a catalyst for CO shift reaction and a catalyst for CO selective oxidation reaction. The catalyst unit 11, when formed as a honeycomb structure, may be one obtained by loading respective catalysts on different areas of one honeycomb structure; however, since each catalyst has a different operating temperature, it is preferred to arrange a plurality of catalyst units each containing a different catalyst, in the reformer. This makes easy the disposition of a heat exchanger for heat recovery and the disposition of a hole(s) for introduction of auxiliary oxygen necessary for CO selective oxidation reaction.

Figure 4:
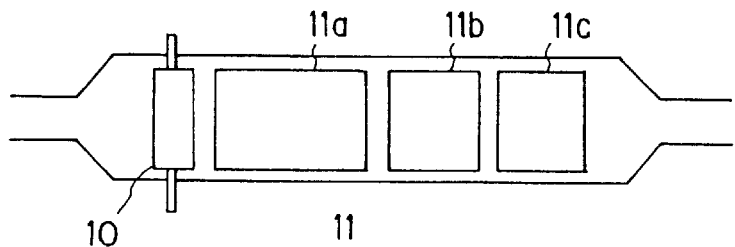
FIG. 4 is a schematic view showing an example of the disposition of a heater unit and a catalyst unit in the reformer of the first invention.
Figure 5:
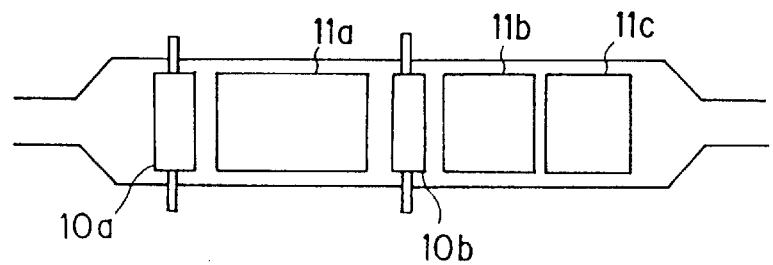
FIG. 5 is a schematic view showing other example of the disposition of a heater unit and a catalyst unit in the reformer of the first invention.
Figure 6:
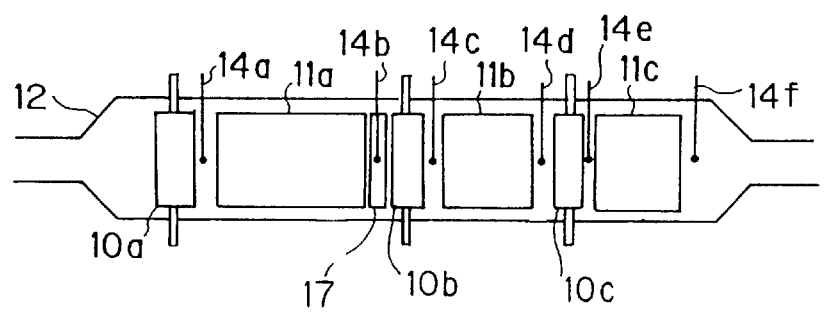
FIG. 6 is a schematic view showing other example of the disposition of a heater unit and a catalyst unit in the reformer of the first invention.
Figure 7:
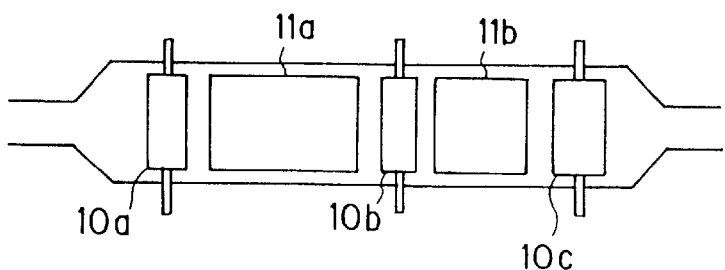
FIG. 7 is a schematic view showing other example of the disposition of a heater unit and a catalyst unit in the reformer of the first invention.

As to the disposition of the heater unit 10 relative to the catalyst unit 11, it is preferred, as shown in FIG. 4, to dispose the heater unit 10 upstream of a plurality of catalyst units 11, i.e. a first catalyst unit 11a, a second catalyst unit 11b and a third catalyst unit 11c. Thereby, the catalyst unit 11 can have, as a whole, an improved warm-up property. As shown in FIG. 5, other embodiment is possible wherein the heater unit 10 is divided into a plurality of heater units 10a and 10b, the heater unit 10a is disposed most upstream, and the heater unit 10b is disposed between a first catalyst unit 11a and a second catalyst unit 11b. In this case, the heater unit 10b imparts a warm-up property and a temperature stabilization effect to the second catalyst unit 11b. As shown in FIG. 6, it is also possible to dispose a heater unit 10b and a heater unit 10c between a first catalyst unit 11a and a second catalyst unit 11b and between the second catalyst unit 11b and a third catalyst unit 11c, respectively. As shown in FIG. 7, still other embodiment is possible wherein a heater unit 10c is disposed most downstream. In this case, if the heater unit 10c contains a catalyst for CO selective oxidation reaction, it is not necessary to dispose a heater unit 11c downstream of the heater unit 10c. Thus, the order of disposition of the heater unit 10 and the catalyst unit 11 and the numbers of these units are optional and, when the heater unit 10 contains catalysts for steam reforming reaction or partial oxidation reaction, CO shift reaction and CO selective oxidation reaction, a combination of a heater unit 10a, a catalyst unit 11 and a heater unit 10b is possible.

Figure 8:
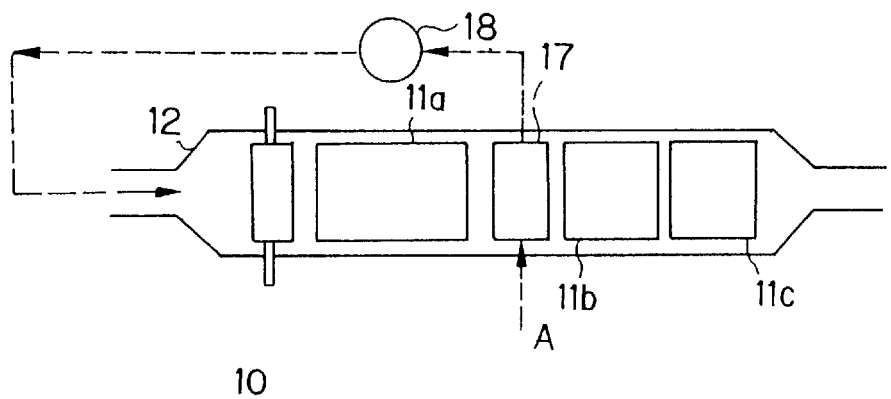
FIG. 8 is a schematic view showing an example of the reformer of the first invention containing a heat exchanger.
Figure 9:
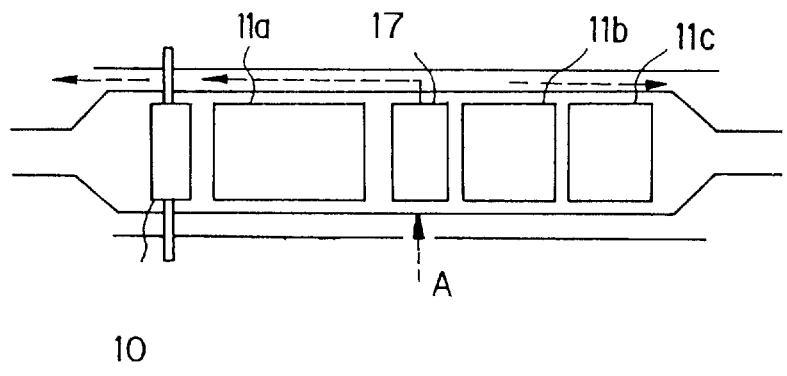
FIG. 9 is a schematic view showing other example of the reformer of the first invention containing a heat exchanger.

Typical reaction temperatures of steam reforming reaction, partial oxidation reaction or decomposition reaction, CO shift reaction and CO selective oxidation reaction are 500° C. or higher, 200 to 300° C. and 100 to 200° C., respectively. Therefore, between the catalyst unit for steam reforming reaction, partial oxidation reaction or decomposition reaction and the catalyst unit for CO shift reaction, it is preferred to dispose, as shown in FIGS. 8 and 9, a heat exchanger 17 to conduct heat recovery, in view of the temperature difference between the two reactions. The heat recovered is used for heating of reactant fluid A and catalyst unit 11.

In the embodiment of FIG. 8, a heat exchanger 17 is disposed between a first catalyst unit 11a and a second catalyst unit 11b; a reactant fluid A receives a heat from the heat exchanger 17, is heated by a vaporizer 18, and is introduced into a casing 12. Incidentally, it is possible to heat the reactant fluid A at the vaporizer and then subject to heat exchange.

There is no restriction as to the kind of the heat exchanger 17, and there can be used a tubular heat exchanger, a platy heat exchanger or the like.

Also in the embodiment of FIG. 9, as in FIG. 8, a heat exchanger 17 is disposed between a first catalyst unit 11a and a second catalyst unit 11b. In this case, however, a fluid receiving heat exchange is not restricted to a reactant fluid and may be a heating medium. The fluid after heat exchange is generally preferred to be sent to the upstream side of a casing where heat is required, but may be sent to the downstream side.

Next, description is made on the second invention.

Figure 10:
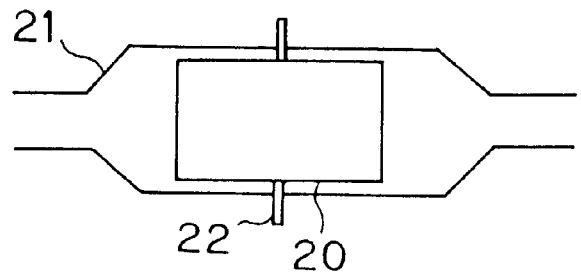
FIG. 10 is a schematic sectional view showing one embodiment of the reformer of the second invention.
Figure 11:
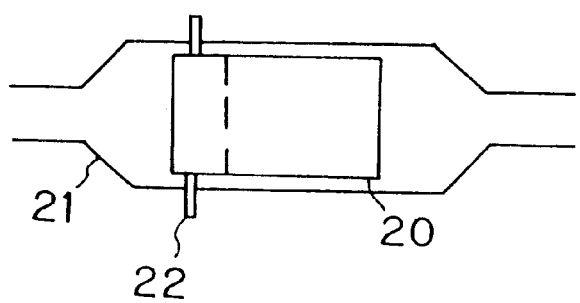
FIG. 11 is a schematic sectional view showing other embodiment of the reformer of the second invention.

The second invention relates to a reformer disposed in the flow path of a reactant fluid, which comprises a catalyst unit capable of generating hydrogen from a reactant fluid containing an organic compound or carbon monoxide, by catalysis, wherein at least part of the catalyst unit is constituted so as to be electrically heatable. Embodiments of the reformer of the second invention are shown in FIGS. 10 and 11.

A catalyst unit 20 is disposed in a metallic casing 21. The catalyst unit 20 has electrodes 22 for electrification thereof and, when electrified, is heated partially or wholly. The catalyst unit 20 of FIG. 10 is heated wholly when electrified, and the catalyst unit 20 of FIG. 11 is heated partially when electrified. Therefore, while in the first invention a heater unit 10 and a catalyst unit 11 are disposed in a casing 12, the catalyst unit 20 per se is heated in the second invention when electrified; and the second invention has the same essential effects as the first invention. Incidentally, the external electric source, sensor for temperature control, flow path of reactant fluid, etc. of the second invention are the same as those of the first invention.

Figure 12:
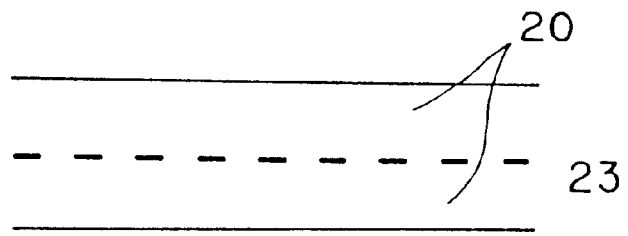
FIG. 12 is a sectional view showing an example of the structure of the catalyst unit used in the reformer of the second invention.

In the second invention, the shape of the catalyst unit 20 is the same as that of the heater unit 10 of the first invention; however, the catalyst unit 20 is preferably a porous material having a porosity of 50% or more because it is disposed in the casing 21 and electrified, most preferably a honeycomb structure in view of the high heat conduction and low pressure loss. The honeycomb structure of the second invention includes even a honeycomb structure as shown in FIG. 12, obtained by placing, in the center of a catalyst unit 20, an electrically heatable core material 23 made of a punched metal plate or a mesh-like metal and making the resulting material into a honeycomb-like or platy module.

When a porous catalyst unit 20 is used, it is most preferably obtained by using, as a porous base material, the same electrically heatable material as used in the heater unit 10 of the first invention 10 and loading, on the base material, catalysts for steam reforming reaction, partial oxidation reaction or decomposition reaction, CO shift reaction and CO selective oxidation reaction. However, the catalyst unit 20 is not restricted thereto, as in the first invention.

The most preferred example of the catalyst unit 20 is a catalyst unit obtained by using, as a base material, a honeycomb structure made of an alloy (e.g. Fe—Cr—Al, Fe—Al or Fe—Cr) in view of the cost and easy production and loading thereon desired catalysts. Effective heating of the part or whole portion of the honeycomb structure depends upon the manner in which the resistance of the honeycomb structure is adjusted.

Figure 13:
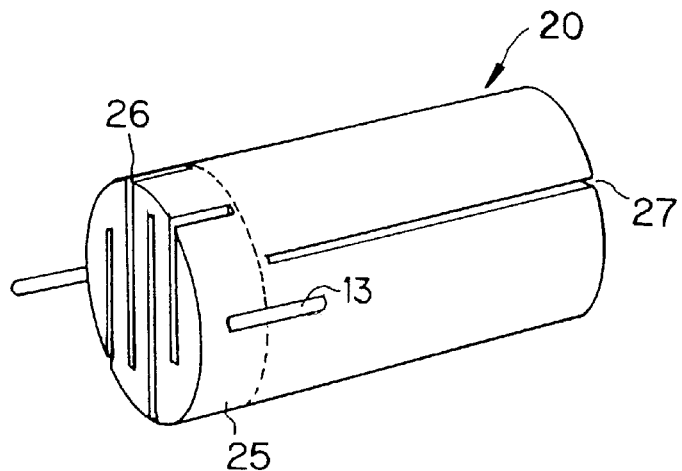
FIG. 13 is a perspective view showing an example of the structure of the catalyst containing slits, used in the reformer of the second invention.

One preferred embodiment of the catalyst unit 20 is shown in FIG. 13. A plurality of slits 26 are formed around the fluid inlet 25 of a catalyst unit 20 constituted by a honeycomb structure, to form a circuit of electric current. In the downstream portion of the catalyst unit 20 is formed a slit 27 so that the slit 27 becomes normal to the direction of the slits 26 formed around the fluid inlet 25. Electrodes 13 are fitted to the catalyst unit 20 around the fluid inlet 25. Thereby, a zigzag path of electric current is formed along the slits 26, whereby electrical heating of only around the fluid inlet 25 of the catalyst unit 20 is made possible. Thus, by forming slits or gaps so that part of the catalyst unit 20 can be heated electrically, the catalyst unit 20 can have a desired heat-generating property.

The same technique as used above is usable when the whole portion of the catalyst unit 20 is electrically heated. Further in the reformer of the second invention, it is possible that a plurality of electrically heatable catalyst units 20 are disposed in the flow path of fluid, the resistances of the individual catalyst units are made different, thereby the whole catalyst units are allowed to have a uniform temperature; or that an electrically heatable catalyst unit is prepared for each of steam reforming reaction, partial oxidation reaction or decomposition reaction, CO shift reaction and CO selective oxidation reaction, and electrification is made so that each catalyst unit can reach its desired temperature; or that different electrification (time length, electric power, timing) is applied to each of a plurality of electrically heatable catalysts. Thus, the efficiency of hydrogen generation can be enhanced. Incidentally, this technique can also be applicable to the heater unit of the first invention.

In the second invention, even when a plurality of electrically heatable catalyst units are used, each of them is preferably made of an electrically heatable material and a catalyst unlike the case of the first invention, whereby a high heat conversion efficiency and a uniform temperature distribution can be obtained easily; it is not necessary to heat the whole portion (large capacity) of catalyst unit; it is preferred to employ partial heating or, as necessary, combine the first invention and the second invention.

Figure 14:
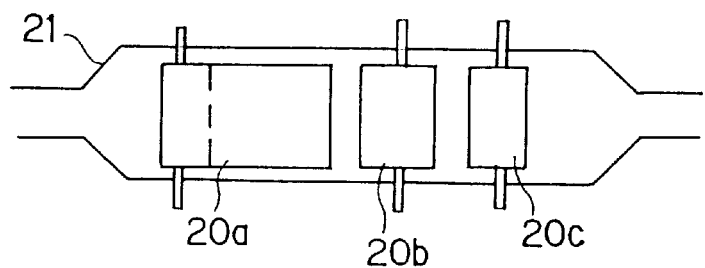
FIG. 14 is a schematic sectional view showing an example of the disposition of a catalyst unit in the reformer of the second invention.

When a plurality of electrically heatable catalyst units 20a, 20b and 20c are disposed in a reformer, they may be electrically heatable each independently as shown in FIG. 14, or may be connected in series, in parallel or in combination thereof.

Figure 15:
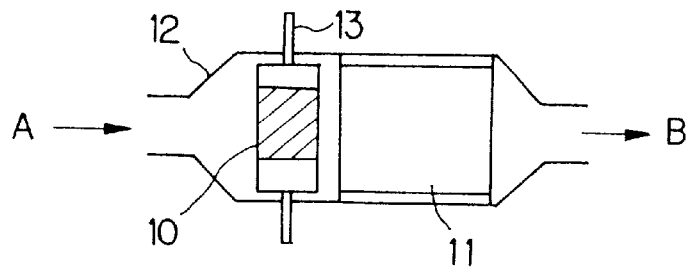
FIG. 15 is a schematic sectional view showing an example of the reformer of the first invention wherein the center of the heater unit is electrically heated.

When an electrically heatable catalyst unit is heated partially, it is possible to heat the upstream side, downstream side or center of the catalyst unit. However, it is preferred to heat the upstream side for the improved warm-up property of the catalyst unit. It is also possible to heat the catalyst unit in such a way that a temperature distribution exists in the radial direction of the catalyst unit. In the catalyst unit for steam reforming, a catalyst unit whose center can be heated higher than the circumferential portion, is preferred because the center of catalyst unit (wherein the speed of reactant fluid is largest) causes the highest reduction in temperature owing to the reaction of the fluid. This idea of "center can be heated higher than circumferential portion" applies also to the heater unit 10 of the reformer of the first invention shown in FIG. 15, disposed upstream of a catalyst unit 11.

In the reformer of the second invention as well, it is preferred to dispose therein a plurality of catalyst units because of difference in reaction temperature between (1) steam reforming reaction, partial oxidation reaction or decomposition reaction, (2) CO shift reaction and (3) CO selective oxidation reaction. Further, it is possible to dispose (a) a heat exchanger downstream of the catalyst for steam reforming reaction, partial oxidation reaction or decomposition reaction, for heat recovery and heating of reactant fluid and catalyst(s) and, as necessary, (b) an inlet for oxygen (actually air) upstream of the catalyst unit for CO selective oxidation reaction.

In the above were described the reformers of the first invention and the second invention. Then, description is made on catalytic reactors which can each be viewed as one form of the first or second invention.

These catalytic reactors are:

a catalytic reactor disposed in the flow path of a reactant fluid, which comprises:
an electrically heatable heater unit, and
a catalyst unit capable of catalyzing an endothermic reaction (eighth invention), and
a catalytic reactor disposed in the flow path of a reactant fluid, which comprises a catalyst unit capable of catalyzing an endothermic reaction, at least part of the catalyst unit being constituted so as to be electrically heatable (ninth invention).

Thus, the eighth and ninth inventions are each a catalytic reactor capable of catalyzing an endothermic reaction and each have a feature in that it has, as a means for imparting a heat to the endothermic reaction, a heater unit or a catalyst unit which is at least partially heatable electrically. The constitutions, compositions, materials and dispositions of the heater unit and the catalyst unit are the same as in the first and second inventions.

As examples of the endothermic reaction, there can be mentioned the above-mentioned steam reforming reaction and decomposition reaction, and a dehydrogenation reaction.

Detailed description is made on the electrically heatable catalyst unit of the third invention.

In the first invention, detailed description was made on the electrically heatable material used as the heater unit 10. In the third invention as well, the same material can be used as an electrically heatable material. The electrically heatable catalyst unit of the third invention contains a catalyst for hydrogen generation and has pores enabling the diffusion of reactant fluid therethrough.

Thus, the electrically heatable catalyst unit of the third invention is constituted by a porous structure (or a structure having passages) and its porosity (or its open frontal area) is preferably 50–95%. A porosity (or an open frontal area) of lower than 50% invites an increase in pressure loss, and a porosity (or an open frontal area) of higher than 95% invites a reduction in strength of the structure.

As the porous structure of the electrically heatable catalyst unit having passages, a honeycomb structure having linear passages in the flow direction of reactant fluid is one preferred embodiment. The honeycomb structure is formed so as to comprise an electrically heatable material and a catalyst for hydrogen generation. The form in which the electrically heatable material is contained in the honeycomb structure, was described previously with respect to the heater unit of the first invention. The electrically heatable material is most preferably a metal of high heat conductivity. As a preferable example of such a metal, a ferrite type metal can be mentioned for the high heat resistance. For example, a Fe—Cr—Al type ferrite can be used wherein the Cr content is 10 to 40% by weight and the Al content is 3 to 15% by weight. Preferably, a small amount of a lanthanum type element, Si, Y or the like is added to the metal to improve the heat-resistance of the metal. It is preferred to load, on the base material of metallic honeycomb structure, a catalyst for hydrogen generation.

The honeycomb structure base material per se may be porous, or may be nonporous like a rolled foil metal. When the temperature of reaction is 900° C. or lower and the thermal shock applied is not so large, a porous base material is preferred because it has a small heat capacity and the peeling between the base material and the catalyst loaded thereon, caused by the difference in their thermal expansions can be prevented. However, a nonporous material can also be sufficiently used. The porosity of the base material is preferably 5 to 40%.

As a preferable embodiment when viewed from a different angle, there can be mentioned a substrate wherein a punched rolled foil is wound with an insulating material or a gap being interposed between the winds, to form an electrically heatable base material and a catalyst for hydrogen generation is loaded thereon. A reactant fluid flows through the passages of honeycomb structure present parallel to the flow direction of reactant fluid and further diffuses into the radial direction of honeycomb structure via the holes of foil. Therefore, this honeycomb structure, when used as a catalyst unit particularly for endothermic reaction (e.g. steam reforming reaction), is considered to be effective for achieving a uniform temperature distribution. Such a honeycomb structure shows a striking effect also when used as an ordinary honeycomb structure of non-heating type.

The honeycomb structure constituting the electrically heatable catalyst unit of the third invention has passages of preferably 0.5 to 10 mm in equivalent diameter. An equivalent diameter of smaller than 0.5 mm invites an increase in pressure loss, and an equivalent diameter of larger than 10 mm invites a reduction in reaction activity. The cell number of the honeycomb structure is preferably 4 to 1,500 cells/in.$^2$, and it is appropriately determined in view of the pressure loss and the reaction activity.

As the catalyst for generating hydrogen from a reactant fluid containing an organic compound or CO, there can be preferably used the following catalyst; that is, a catalyst containing, as main components, an oxide and at least one kind of metal selected from the metal elements of groups VB to VIII, IB and IIB of long-form periodic table.

As to the metal element effective for steam reforming reaction, partial oxidation reaction or decomposition reaction, it is preferred to use a metal of group VIII as an essential metal element. Preferred metal elements are Ni, Rh Ru, Ir, Pd, Pt, Co and Fe, and they are used singly or in combination. It is preferred to add thereto, as a promotor catalyst, V or Nb of group VB; Cr, Mn or W of group VIB; Mn or Re of group VIIB; or the like. Also, an alkaline earth metal may be added for prevention of carbonization. These metals are ordinarily loaded on a heat-resistant oxide, whereby the resulting catalyst can have an increased specific surface area, an enhanced activity and a durability to reaction temperature.

As the heat-resistant oxide, there can be used $Al_2O_3$, $SiO_2$, $TiO_2$, $ZrO_2$, MgO, zeolite, SAPO, ALPO, a layer structure compound or a compound oxide thereof. Of these oxides, one having a specific surface area of ordinarily 5 to 300 m$^2$/g is used. The heat-resistant oxide and the above-mentioned metal component are made into a uniform mixture by an ordinary means such as chemical method (e.g. immersion, coprecipitation or sol-gel), physical mixing or the like. The uniform mixture as well must have a specific surface area of ordinarily 5 to 300 m$^2$/g. A specific surface area of smaller than 5 m$^2$/g invites a reduced activity, and a specific surface area of larger than 300 m$^2$/g invites striking property change at high temperatures and resultant reduction in durability. The above range of specific surface area applies to all the catalysts mentioned later.

As the heat-resistant oxide, alumina $Al_2O_3$ can be preferably used because it is relatively inexpensive and has a high specific surface area even at high temperatures. There can also be used spinel obtained by adding magnesia to alumina, or magnesia (which is a basic carrier) per se or a compound oxide thereof for suppressing carbonization.

The proportion of the catalyst metal added to the heat-resistant oxide is preferably 1 to 30% by weight. When the catalyst metal is a noble metal, addition of up to about 10% by weight is sufficient because the noble metal has a high activity. When the catalyst metal is a base metal, addition of 10 to 30% by weight is preferred.

As the catalyst appropriate for CO shift reaction, there is often used Fe or CO of group VIII, Cu of group IB, Zn of group IIB, or the like. The metal elements specified in the present invention show a fairly high activity for CO shift reaction. Since the metals showing an activity at relatively low temperatures include Cu, Zn or both, loading of such a metal or metal combination on the above-mentioned heat-resistant oxide (e.g. alumina) can assure a high heat-resistance. At that time, the amount of the metal added to the heat-resistant oxide is preferably 10 to 50% by weight. When the CO shift reaction is conducted at relatively high temperatures, spinel (e.g. Fe—Cr) per se can also be used.

As the catalyst appropriate for CO selective oxidation reaction, there can be mentioned metals such as Mn of group VII, Co and noble metals of group VIII, Cu, Ag and Au of group IB and the like. They can be used ordinarily by being loaded on the above-mentioned heat-resistant oxide. The catalyst need not oxidize hydrogen produced, and Pt or the like having a strong interaction with CO can be used. A hopcalite catalyst is also a preferred catalyst.

When these catalysts are loaded on a base material of honeycomb structure in a film state, the film thickness is preferably 5 to 100 $\mu$m. A film thickness of smaller than 5 $\mu$m invites a lower activity, and a film thickness of larger than 100 $\mu$m invites a higher pressure loss.

As described with respect to the first and second inventions, it is sufficient that at least part of the electrically heatable catalyst unit is heatable. The electrically heatable catalyst unit, when used for an endothermic reaction, is preferably constituted so that only the center or only around the fluid inlet of the catalyst unit is electrically heatable, because the center (where a reactant fluid passes in a larger amount) and around the fluid inlet (where the concentration of the reactant fluid is high) cause the largest temperature reduction.

The electrically heatable catalyst unit is allowed to have a volume of generally 30 to 1,000 cc per one unit, and the total volume of the electrically heatable portion of the catalyst unit is preferably 300 cc or less. The reason is that when said total volume is larger than 300 cc, the catalyst unit has a large heat capacity and requires a very large energy for heating and, when said total volume is smaller than 300 cc, the catalyst unit has a sufficient heat conduction area for heating the non-heatable catalyst portion.

The electrically heatable catalyst unit can have any desired sectional shape selected from a circle (of ordinarily about 50 to 200 mm in diameter), a square, an ellipse and the like. When used in a large-sized hydrogen generator, a plurality of electrically heatable catalyst units may be used in combination in a casing.

In the electrically heatable catalyst unit, the passage shape of the honeycomb structure may be any of a circle, a square, a polygon, a corrugation and the like.

The electrically heatable catalyst unit of the third invention contains a catalyst for hydrogen generation. When the catalyst unit is viewed as an electrically heatable catalyst unit containing a catalyst capable of giving rise to an endothermic reaction in place of the catalyst for hydrogen generation, that latter catalyst unit is the tenth invention. The catalyst unit of the tenth invention has the same constitution as the third invention except for the above-mentioned point.

Next, description is made on the fourth and fifth inventions with reference to FIGS. 6 and 14.

In FIG. 6, in a flow path of fluid (a casing 12) are disposed a first heater unit 10a, a first catalyst unit 11a, a second heater unit 10b, a second catalyst unit 11b, a third heater unit 10c and a third catalyst unit 11c. The first heater unit 10a and the first heater unit 11a are provided with an catalytic activity for any of steam reforming reaction, partial oxidation reaction and decomposition reaction; the second heater unit 10b and the second catalyst unit 11b are provided with a catalytic activity for CO shift reaction; and the third heater unit 10c and the third catalyst unit 11c are provided with a catalytic activity for CO selective oxidation reaction. Electricity can be supplied from an external electric source to the heater units 10a, 10b and 10c. Downstream of each of the heater units 10a, 10b and 10c and the catalyst units 11a, 11b and 11c are disposed temperature sensors (thermocouples) 14a, 14b, 14c, 14d, 14e and 14f. As necessary, a heat exchanger 17 is disposed downstream of the first catalyst unit 11a and, in the case of FIG. 6, is used for preheating of a reactant fluid.

In the fourth invention, first, electrification is started. In one operational mode, electrification is made until the heater unit 10 reaches a desired temperature, preferably until the first heater unit 10a reaches the temperature necessary for steam reforming reaction, partial oxidation reaction or decomposition reaction. The temperature necessary for steam reforming reaction, partial oxidation reaction or decomposition reaction is 500° C. or higher, preferably 600° C. or higher, and electrification is continued until the temperature is attained. The temperature per se of the first heater unit 10a may be measured, or temperature control may be made based on the predetermined time length of electrification. When the desired temperature has been attained, a reactant fluid is allowed to start flowing. The reactant fluid is preferably preheated to a temperature of 500° C. or higher. Even when the temperature of the reactant fluid is lower than 500° C., electrification (continuous or intermittent) of the first heater unit 10a allows the steam reforming reaction, partial oxidation reaction or decomposition reaction on the first heater unit 10a to proceed. The first catalyst unit 11a downstream of the first heater unit 10a is warmed up and heated by the reactant fluid which has passed through the first heater unit 10a; as a result, electrification of the first heater unit 10a can be weakened or may be stopped.

In a similar manner, the second heater unit 10b is electrified simultaneously with the first heater unit 10a and heated to a temperature of 300° C. or higher and, in that state, awaits introduction of the reactant fluid. During the awaiting, electrification of the second heater unit 10b may be continued or stopped. The third heater unit 10c is subjected to the same operation as for the second heater unit 10b except that the third heater unit 10c is electrified and heated to a temperature of 150° C. or higher.

Thus, hydrogen generation can be started favorably in a very short time. The time of electrification is appropriately 60 seconds and the reactant fluid can be allowed to flow at latest before the end of the time.

FIG. 14 shows a reformer according to the second invention, wherein a first catalyst unit 20a, a second catalyst unit 20b and a third catalyst unit 20c each of electrical heatability are disposed in this order.

Therefore, in the operational method of the fifth invention, the catalyst units 20a, 20b and 20c are electrified and heated instead of electrification and heating of the heater unit in the fourth invention. The operational method of the fifth invention is basically the same as that of the fourth invention. Therefore, later description is made on operational modes each using a reformer wherein a catalyst unit and a heater unit are disposed separately.

With the reformer of FIG. 6, other operational mode is described. That is, electrification of the heater unit 10 is started and, simultaneously therewith, an inert gas, air or the like is allowed to flow. When an oxygen-containing gas (e.g. air) is used in a catalytic steam reforming reaction, care must be taken because the gas oxidizes the catalyst used in the reaction. The heat generated in the heater unit 10 is transferred to the inert gas; the heat received by the inert gas heats the catalyst 11 downstream of the heater unit 10. When at least the first heater unit 10a, preferably the first heater unit 10a and the first catalyst unit 11a have reached respective operational temperatures, a reactant fluid is allowed to start flowing. At that time, it is preferred that the second and third heater units 10b and 10c and the second and third catalyst units 11b and 11c are at respective operational temperatures. The time length of electrification is not larger than about 120 seconds; the warm-up property is very high as compared with those of conventional arts; further, the catalyst unit 11 is preheated; therefore, this operational mode has a high reaction activity and can treat a relatively large amount of a reactant fluid.

In still other operational mode, in a relatively short time, for example, 10 seconds from the start of electrification of the heater unit 10, a reactant fluid is allowed to start flowing. The flow rate of the reactant fluid is controlled preferably to such an extent that the catalytic reaction on the first heater unit 10a proceeds sufficiently; the flow rate is increased with the temperature increases of the downstream catalyst units and heater units; and a steady-state operation is reached. In this mode, the operation can be started in a very short time and, in an extreme case, even when electrification and flow of reactant fluid are started simultaneously, a satisfactory operation is possible. Incidentally, in this case, it is necessary that the reactant fluid is preheated to at least 500° C., preferably at least 700° C. at the initial timing of introduction.

In still other operational mode, electrification of the heater unit 10 is started and, when the third heater unit 10c has reached the temperature range of complete oxidation reaction of an organic compound (a starting material) which is higher than the temperature range of CO selective oxidation reaction, i.e. a temperature range of 300° or higher, a reactant fluid is allowed to start flowing. Part of the organic compound reaches the third heater unit 10c in an unreacted state but, while the first and second heater units 10a and 10b and the catalyst units 11a and 11b do not function sufficiently, are burnt and discharged out of the system. When the first and second heater units 10a and 10b and the catalyst units 11a and 11b have started sufficient functioning or prior to that, electrification of the third heater unit 10c is weakened or stopped; the temperature of the third heater unit 10c is decreased to the temperature range of CO selective oxidation reaction; then, a steady-state operation is conducted. In this operational mode as well, the reactant fluid can be allowed to start flowing in a very short time from the start of electrification or simultaneously with the start of electrification. Incidentally, the exhaust gas generated during the start-up of reformer can be used as a heating source for fuel cell or subjected to heat recovery via a heat exchanger.

As described above, by using a heater unit or an electrically heatable catalyst unit, the warm-up property of reformer can be improved. The above-mentioned operational modes may be used singly or in combination, or a heater unit and an electrically heatable catalyst unit may be used in combination as an option.

Next, description is made on the sixth and seventh invention with reference to FIG. 6.

The operational method of the present reformer up to the timing when the catalyst unit 11 is warmed up, is disclosed in the fourth invention. In order to favorably continue the reaction of the reformer even after the catalyst unit 11 has reached its operational temperature range, the following operational method is employed.

After the first heater unit 10a and the first catalyst unit 11a have reached the temperature range of intended steam reforming reaction, the temperatures of the first heater unit 10a and the first catalyst unit 11a come down with the lapse of time because the steam reforming reaction is generally an endothermic reaction. Therefore, to allow the reaction to proceed stably, the first heater unit 10a is electrified and heated continuously or intermittently to stabilize the temperatures of the first heater unit 10a and the downstream first catalyst unit 11a. Supply of electric power may be made at a constant level or may be varied depending upon the temperatures of the first heater unit 10a and the first catalyst unit 11a.

The second and third heater units 10b and 10c are also electrified as necessary because the endothermic reaction taking place at the first heater unit 10a and the first catalyst unit 11a reduces the temperature of fluid, whereby the temperatures of the second and third heater units 10b and 10c and the second and third catalyst units 11b and 11c are increased in the same manner as used in electrifying and heating the first heater unit 10a. When the temperatures of the first heater unit 10a and the first catalyst unit 11a have been stabilized by electrification of the first heater unit 10a, electrification of the second and third heater units 10b and 10c are not necessary.

As described with respect to the first to third inventions, when an endothermic reaction is carried out, the heater unit or the catalyst unit shows the largest temperature decrease at the center through which a reactant fluid passes in a larger amount, and at around the fluid inlet where the reactant fluid has a high concentration. Therefore, it is preferred that the heater unit is constructed so that only the center can be electrified and the electrically heatable catalyst unit is constructed so that only around the inlet can be electrified. These partial electrifications may be combined appropriately.

When the first catalyst unit 11a is for partial oxidation reaction (exothermic reaction), heating is unnecessary in the steady-state operation of reformer. However, when the present reformer is mounted on an automobile, the reformer may be cooled depending upon the speed of the automobile and, when the reformer is used in an on-site application, the reaction may cause self-vibration and the catalyst temperature may fluctuate periodically; therefore, in order to allow the reaction to proceed stably, it is preferred that electrification is conducted to stabilize the temperatures of the heater unit 10 and the catalyst unit 11.

The temperature measurements of heater unit, catalyst unit and reactant fluid are made at desired places and the data obtained are processed by a computer. Thus, by employing any of the above operational methods or combining them appropriately, hydrogen can be generated favorably.

Next, detailed description is made on the operational method of the present reformer when mounted on an automobile.

In starting an automobile, first, the engine is driven using the battery. Simultaneously therewith, electrification of the heater unit or the electrically heatable catalyst unit both of the reformer is started by the battery. Further, a reactant fluid, for example, a gasoline or methanol is vaporized also by the battery or the like, and introduced into the reformer. According to the operational method of the present invention, the reformer is warmed up and generation of hydrogen is started favorably. Incidentally, for warming up of the reformer, an electric source such as capacitor (condenser) or the like can also be used effectively. After the reformer has been warmed up, operation of generator is started; the electric energy obtained thereby is not only used for charging of the battery but also sent to the heater unit and electrically heatable catalyst unit of the reformer directly from the generator or via a transformer to stably operate the reformer.

The CO concentration after CO shift reaction is about 10,000 ppm and is reduced generally to 10 ppm or less by CO selective oxidation reaction. In hydrogen generation by steam reforming reaction, removal of hydrogen out of the reaction system is advantageous in view of the equilibrium of the reaction; therefore, a combination of the present reformer with a hydrogen-permeable membrane is an interesting and preferred application of the present reformer.

Disposing a heater unit (such as mentioned in the present invention) upstream of the present reformer to use the heater unit for preheating of reactant fluid is also a preferred embodiment of the present reformer. In this case, using, as the heater unit for preheating of reactant fluid, a heater unit constituted by a honeycomb structure (this heater need no loading of catalyst thereon) is preferred because the heater has a high efficiency of heat exchange and a gas-straightening effect.

In the above, the operational methods of reformers were described. Most of these operational methods are also applicable to the methods for operation of the catalytic reactors of the eleventh and twelfth inventions.

As described above, the reformer of the present invention enables generation of high-purity hydrogen for industrial or automobile application, in a short time.

Further, with the catalytic reactor of the present invention capable of giving rise to an endothermic reaction, the reaction temperature can be maintained favorably.

What is claimed is:

1. A process for producing hydrogen gas by reforming a reactant fluid containing an organic compound or carbon monoxide in an apparatus having at least one catalyst unit and at least a first heater unit, which comprises:
    electrically heating said heater unit,
    feeding a reactant fluid containing an organic compound or carbon monoxide into the apparatus through an inlet for said reactant fluid,
    contacting said reactant fluid
        a) first with said first heater unit and then with the catalyst of said at least one catalyst unit, or
        b) first with said first heater unit combined with the catalyst of said at least one catalyst unit, and
    reforming the reactant fluid, by catalyst, with said catalyst to obtain hydrogen gas which leaves through an outlet.

2. A process for producing hydrogen gas according to claim 1, wherein said catalyst is selected from the group consisting of steam reforming catalysts, partial oxidation reaction catalysts, decomposition reaction catalysts, CO shift catalysts, and CO oxidation reaction catalysts.

3. A process for producing hydrogen gas according to claim 1, wherein there are a plurality of catalyst units and wherein said heater unit is disposed between said plurality of catalyst units.

4. A process for producing hydrogen gas according to claim 1, wherein in a flow path in the apparatus from the reactant gas entering through the inlet and the hydrogen gas leaving through the outlet said heater unit is disposed in the flow path downstream of at least one catalyst unit.

5. A process for producing hydrogen gas according to claim 1, wherein in a flow path in the apparatus from the reactant gas entering through the inlet and the hydrogen gas leaving through the outlet a heat exchanger is disposed either (a) downstream of said at least one catalyst unit in a direction of the flow path of the reactant fluid or (b) disposed between a plurality of catalyst units.

6. A process for producing hydrogen gas according to claim 5, wherein the reforming generates heat and said heat exchanger recovers said heat.

* * * * *